Feb. 21, 1967 O. I. STANGELAND 3,304,807
POWER TRANSMISSION MECHANISM
Filed March 30, 1964 5 Sheets-Sheet 1
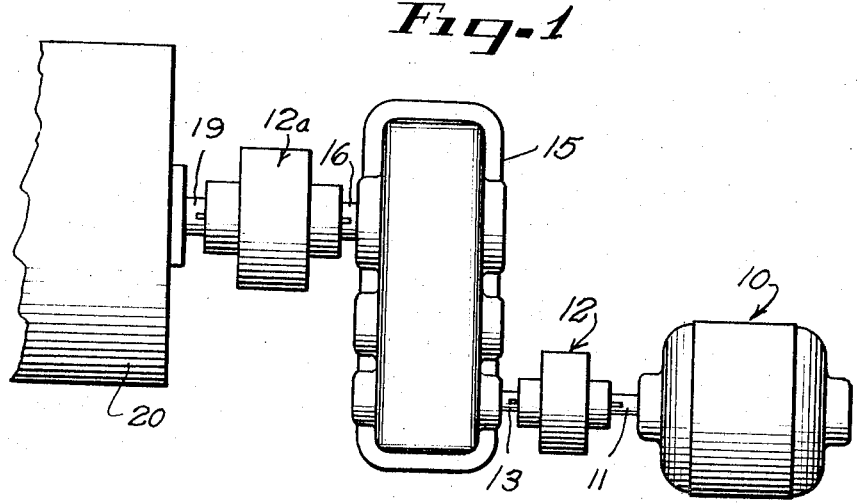
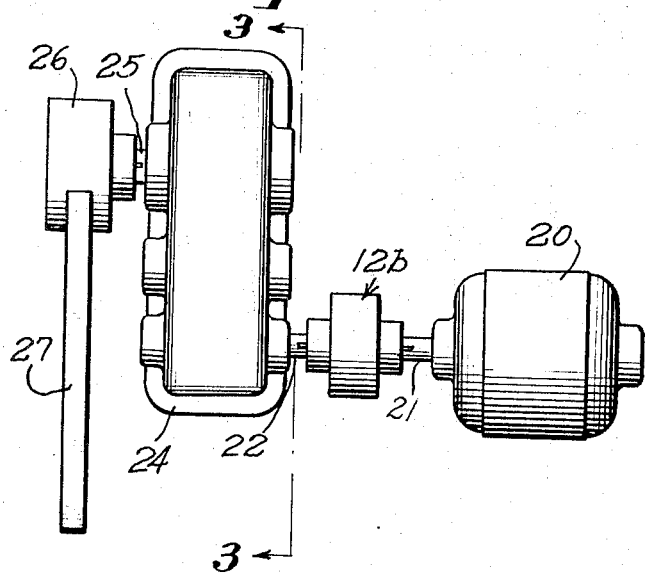
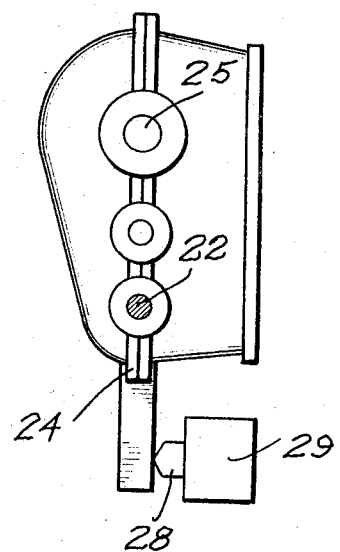
INVENTOR.
Ole I. Stangeland
BY Fidler, Bradley,
Patnaude & Pettesbridge
ATTORNEYS

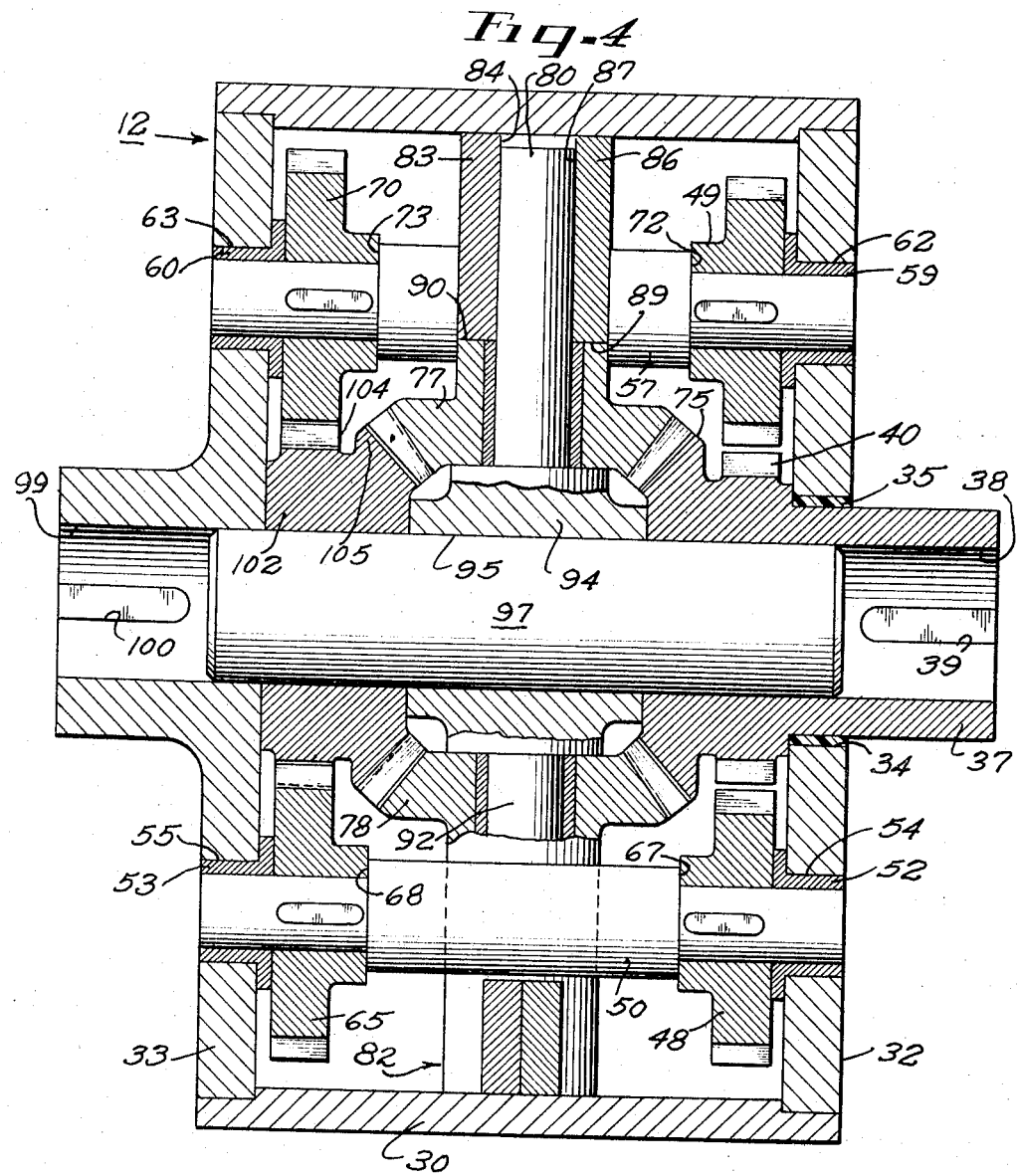

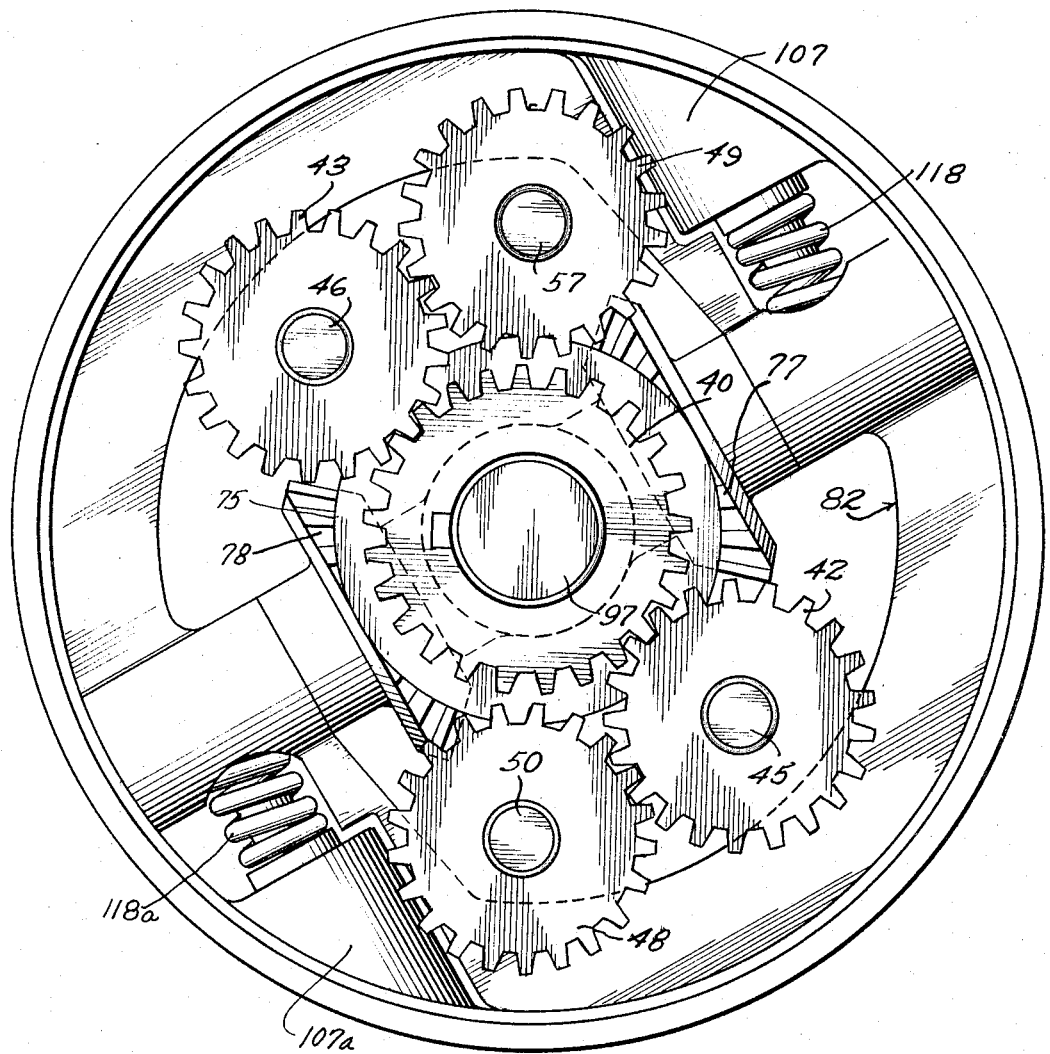

Feb. 21, 1967

O. I. STANGELAND 3,304,807

POWER TRANSMISSION MECHANISM

Filed March 30, 1964

INVENTOR.
Ole I. Stangeland
BY
ATTORNEYS

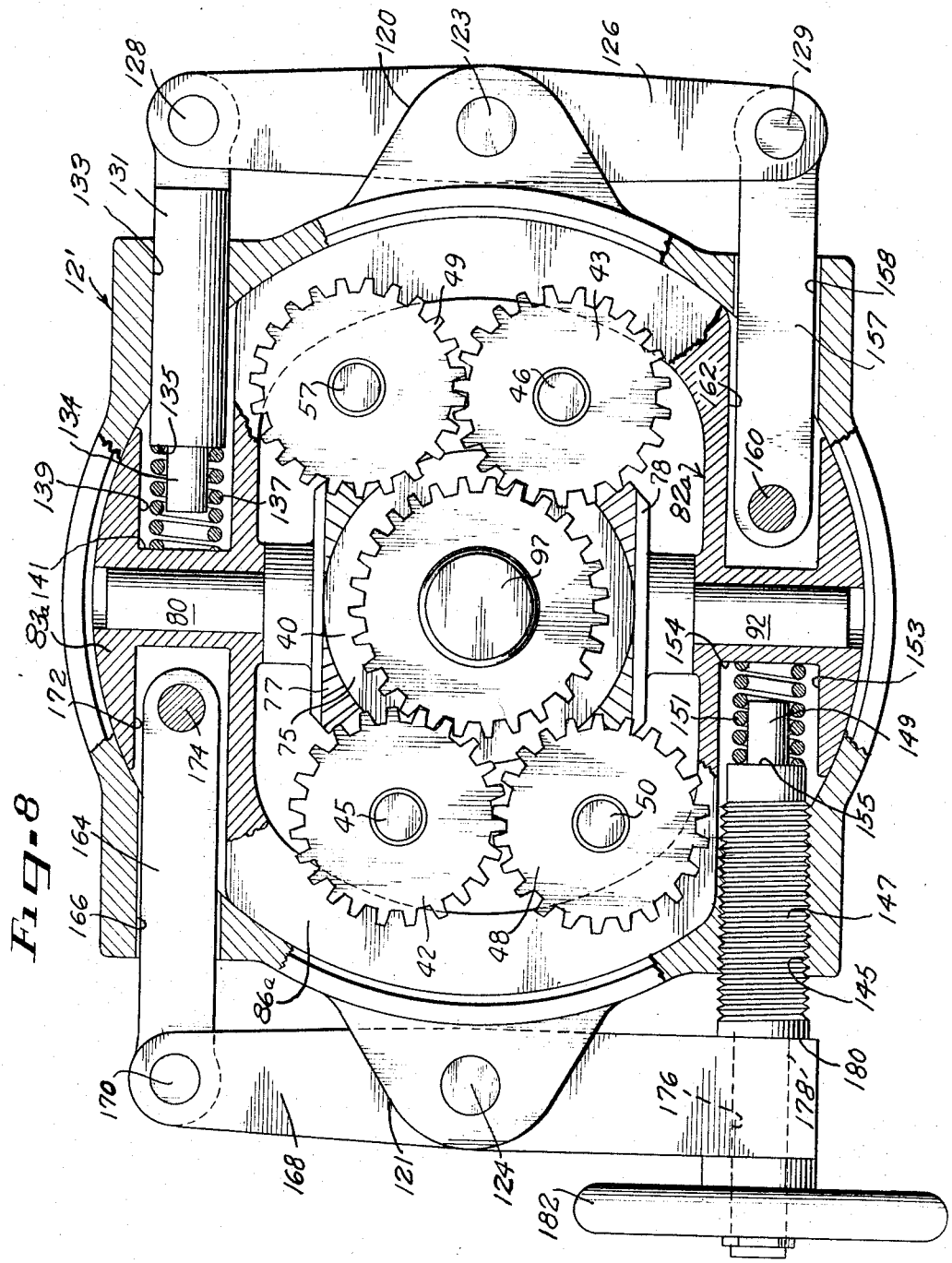

United States Patent Office 3,304,807
Patented Feb. 21, 1967

3,304,807
POWER TRANSMISSION MECHANISM
Ole I. Stangeland, 3300 N. New England Ave.,
Chicago, Ill. 60634
Filed Mar. 30, 1964, Ser. No. 355,863
8 Claims. (Cl. 74—751)

My invention relates to power transmission mechanisms which may be used in various types of machinery for interconnecting a driving or input shaft to a driven or output shaft. More particularly, my invention relates to a power transmission gear assembly which is adjustable to couple no more than a preset value of torque between the driving shaft and the driven shaft. Such a transmission has many different applications. To name just a few, it may be used as a shock-absorbing coupling, it may be used for making torque measurements or it may be used as a brake, and those skilled in this art will recognize many other uses for the torque coupling mechanism of this invention.

The prior art type power transmission mechanisms which perform the functions of the power transmission of my invention commonly employ friction elements such as friction discs or friction bands surrounding a pulley. Several disadvantages are incident to the use of such friction elements, the foremost of which is the need to replace such elements at relatively frequent intervals as the friction surfaces wear away. Also, since the friction surfaces of such elements wear away during use, inaccuracies are inherently introduced into the system. Moreover, where the power transmission is used as a safety device to prevent the transmission therethrough of excessive torques which would damage the associated equipment or place the operating personnel in danger of serious injury, it is extremely important that the transmission be dependable in operation.

Therefore, a principal object of the present invention is to provide a new and improved power transmission mechanism.

Another object of the present invention is to provide a new and improved torque transmission gear assembly.

Still another object of the present invention is to provide a new and improved torque transmission mechanism incorporating means for readily adjusting the maximum torque transmittible therethrough between the input and output of the transmission.

A further object of the present invention is to provide a new and improved power transmission mechanism which is simple and compact in construction, which is efficient in operation, and which has a relatively long life requiring little if any maintenance.

A still further object of the present invention is to provide a new and improved power transmission gear assembly having sufficient versatility to be used as a shock absorbing coupling, as a brake, and for making torque measurements.

Another object of the present invention is to provide a new and improved power transmission mechanism which can be manufactured at a relatively low cost and which is efficient in operation.

Further objects and advantages and a better understanding of the present invention may be had by reference to the following detailed description taken in connection with the accompanying drawings in which:

FIG. 1 is a plan view of a torque transmission system using two power transmission mechanisms of the present invention as shock absorbing couplings;

FIG. 2 is a plan view of a torque measuring system employing the power transmission mechanism of the present invention;

FIG. 3 is a side elevational view of a portion of the system of FIG. 2 taken along the line 3—3 thereof;

FIG. 4 is a sectional view taken along the center line of a torque transmission gear assembly embodying the present invention;

FIG. 5 is a view taken from the right-hand side of the assembly of FIG. 4 with the cover broken away to show the interior mechanism thereof;

FIG. 8 is a view similar to FIG. 5 showing an alternative mechanism for adjusting the maximum torque transmittible through the power transmission mechanism thereof, such as for a brake application wherein the housing of the device is held stationary and adjustment of the torque serves to brake the input.

Figure 6:
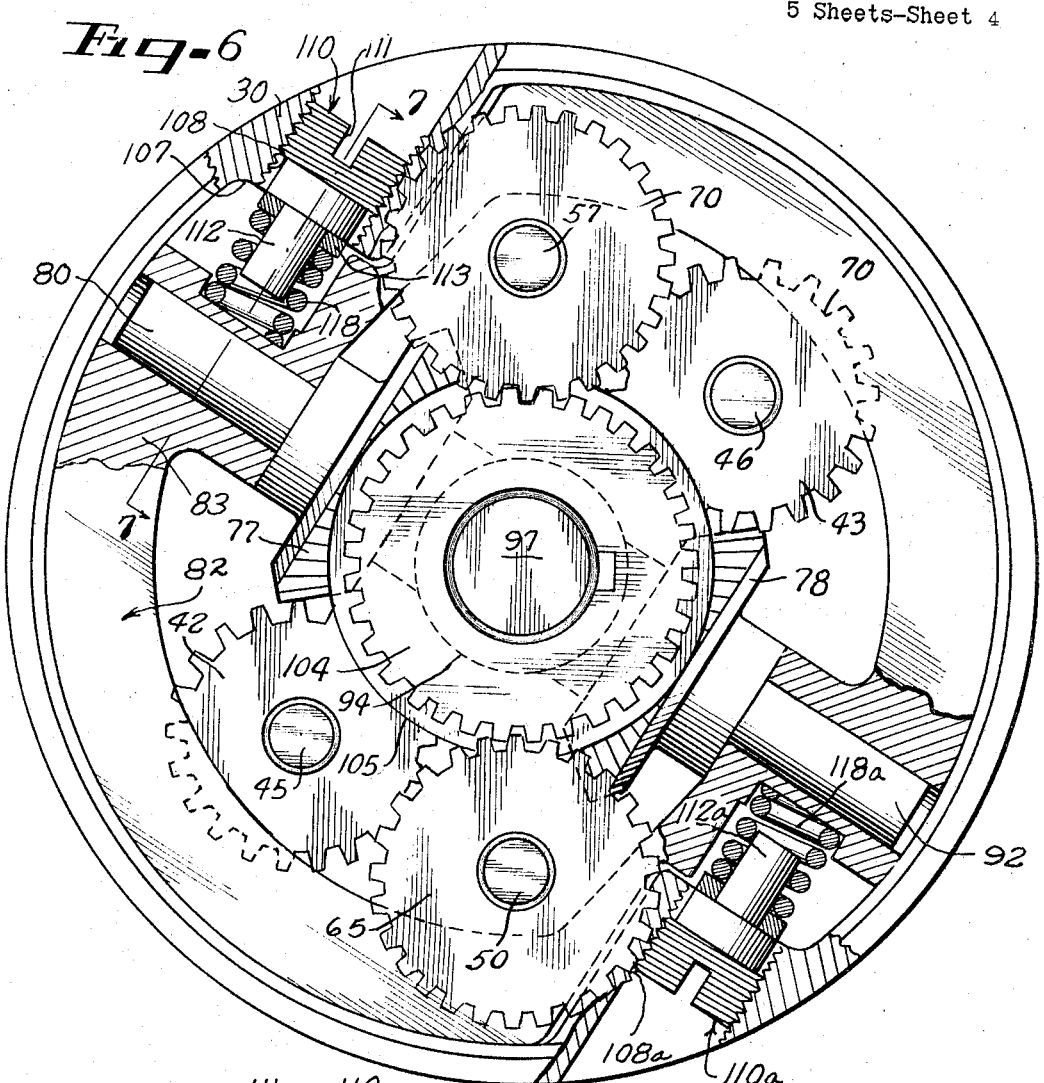
FIG. 6 is a view taken from the left-hand side of the assembly of FIG. 4 with the cover portions broken away to show the interior mechanism thereof.

Referring now to the drawings and particularly to FIG. 1 thereof, there is shown an electric motor 10 having an output shaft 11 connected to the input of a torque transmission mechanism 12 embodying the present invention. In this system the transmission 12 provides a shock-absorbing coupling between the motor shaft 11 and the input shaft 13 of a reduction gear assembly 15 having an output shaft 16 connected to the input of another shock-absorbing power transmission unit 12a also embodying the present invention. The output of the transmission unit 12a is connected to the input shaft 19 of a load device schematically indicated at 20. As is more fully described hereinafter, the power transmission mechanism 12a may be adjusted to uncouple the shaft 16 from the shaft 19 whenever the torque differential between the shafts 16 and 19 exceeds a presettable value. Should the load mechanism 20 become jammed so that the torque required to rotate the input shaft 19 exceeds the value preset in the power transmission unit 12a, the gear mechanism in the power transmission unit 12a rotates freely and does not couple the shaft 16 to the shaft 19. The power transmission unit 12a thus prevents damage to either the load 20 or to the reduction gear assembly 15 or to both as the case may be. The power transmission unit 12 is used in this same general manner and is adjustably set to uncouple the motor shaft 11 from the input shaft 13 of the gear reduction unit 15 when a preset maximum value of torque is exceeded. Should the gear set 15 require an additional torque in order to be driven, the transmission unit 12 disconnects the input shaft 13 from the motor shaft 11 and the internal mechanism in the transmission unit 12 thereafter rotates freely to permit the motor 10 to continue to operate without being unduly overloaded and without driving the input shaft 13 to the gear reduction unit 15. The power transmission units 12 and 12a thus prevent damage to the motor 10, to the gear reduction unit 15 and to the load 20.

Another application for the power transmission mechanism of the present invention is in a Prony brake system for measuring the output torque from a motor. Referring to FIGS. 2 and 3, an electric motor 20 has an output shaft 21 connected to the input of a power transmission unit 12b embodying the present invention. The output of the unit 12b is connected to the input shaft 22 of a gear reduction unit 24 having an output shaft 25. Connected directly to the output shaft 25 is a wheel 26 having an arm 27 suitably secured thereto as by welding. As best shown in FIG. 3, a knife-edge 28 extends from a block 29 which may be placed on a weighing scale (not shown). The torque transmitted through the transmission unit 12b is then adjusted and may be calculated in the usual manner by measuring the force exerted on the scale through the knife edge 28. For production line type testing, the transmission unit 12b may be adjusted to provide a predetermined load or torque on the shaft 21 and thereafter the motors 20 to be tested may be connected seriatim to the input of the transmission unit 12b and their r.p.m. measured to determine if it falls within a satisfactory range when the preset torque is applied thereto. If desired, the wheel 26 may be replaced by a transmission unit 12 with the arm 27 secured to the output thereof. The load on the shaft 25 can then be adjusted by this unit 12 to the desired value as measured by the associated scale. Many other uses for the adjustable power transmission unit of the present invention will be readily apparent to those skilled in the art and for that reason they are not further discussed herein.

Referring now to FIG. 4, wherein the power transmission unit 12 embodying the present invention is shown, a hollow, generally cylindrical housing member 30 has a pair of annular rabbets respectively located at the opposite ends thereof and a pair of end plates 32 and 33 secured therein. The plate 32 is provided with a central aperture 34 having a suitable annular bushing 35 mounted therein. A rotatable input member 37 having a longitudinal bore 38 therein for receiving a drive shaft is journalled in the bushing 35. A keyway 39 is provided in the wall of the bore 38 for receiving a suitable key which secures the drive shaft to the input member 37 whereby the member 37 rotates in unison with the drive shaft. The input member 37 is a multiple gear and includes a spur gear portion 40 which, as best shown in FIG. 5 mates with a pair of idler gears 42 and 43 which are freely rotatable on respective shafts 45 and 46. The shafts 45 and 46 are supported at their ends in the plates 32 and 33, as seen in FIG. 4. The idler gears 42 and 43 respectively mate with and thus drive a pair of spur gears 48 and 49, as seen in FIGS. 4 and 5. The gear 48 is suitably keyed to a jack shaft 50 which is journaled at its ends in a pair of bushings 52 and 53 mounted in aligned openings 54 and 55 in the end plates 32 and 33. In like manner the gear 49 is keyed to a jack shaft 57 which is journaled at its ends in a pair of bushings 59 and 60 respectively mounted in aligned openings 62 and 63 in the end plates 32 and 33. A spur gear 65 mating with gear 104 is also keyed on the shaft 50 and the shaft 50 has reduced diameter end portions thereby to provide outwardly facing annular shoulders 67 and 68 which cooperate with the bushings 52 and 53 to maintain the gears 48 and 65 at fixed longitudinal positions along the shaft 50. A spur gear 70 also mating with gear 104 is similarly keyed to the shaft 57 and the gears 49 and 70 are held in place along the shaft 57 by means of a pair of outwardly facing annular shoulders 72 and 73 on the shaft 57.

Figure 7:
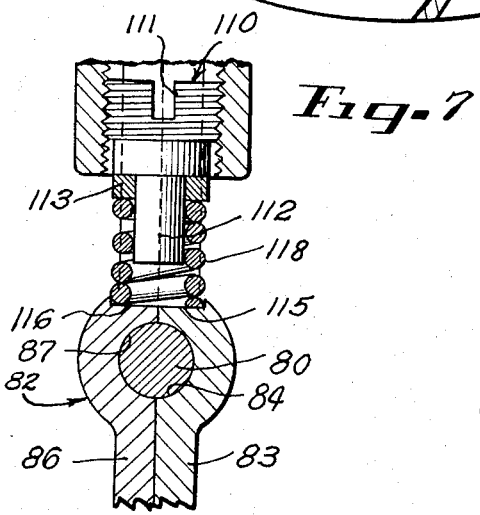
FIG. 7 is a sectional view taken along the line 7—7 of FIG. 6.

In addition to the gear portion 40 the input member 37 is also provided with a bevel gear portion 75 which mates with a pair of bevel gears 77 and 78. The bevel gear 77 is freely rotatable on a stub shaft 80 which is secured in an adjustable ring assembly 82, as shown in FIGURES 4, 5 and 6. Considered in greater detail, the ring assembly 82 includes a first ring 83, as shown in FIGURES 4, 5 and 6, having a semicylindrical recess 84 for receiving a portion of the shaft 80. A similar ring 86, as shown in FIGURES 4 and 7, having a semicylindrical recess 87 is secured to the ring 83 with the shaft 80 held within the recesses 84 and 87. Suitable bolts (not visible in the drawings) are provided for securing the rings 83 and 86 together. The rings 83 and 86 cooperate at the location of the shaft 80 to provide an annular shoulder 89 against which the hub 90 of the gear 77 abuts thereby to maintain the gear 77 in mating engagement with the gears 75 and 105.

As more fully described hereinafter, the ring assembly is part of the torque adjusting mechanism of the present invention, and the rings 83 and 86 have an outside diameter sufficiently less than the inside diameter of the housing 30 to permit relative rotation between the ring assembly 82 and the housing 30. The bevel gear 78 is freely rotatable on a stub shaft 92 which is supported in the housing 30 by the ring elements 83 and 86 in exactly the same manner as the stub shaft 80 is supported. In order to hold the stub shafts 80 and 92 in the position best shown in FIG. 4, there is provided a collar 94 having a circular bore 95 loosely receiving a stub shaft 97 which extends partially through the input member 37 and into a central bore 99 in the end plate 33. The outer end portion of the bore 99 is provided with a longitudinally extending keyway 100 for locking the end plate 33 to a driven shaft (not shown) which is receivable in the bore 99.

A multiple gear 102 is freely rotatable on the shaft 97 and includes a first spur gear section 104 which mates with the spur gears 65 and 70 and a bevel gear section 105 which mates with the bevel gears 77 and 78. As best shown in FIG. 4, the stub shaft 97 extends a substantial distance into the input member 37 and a substantial distance into the bore 99 in the end plate 33, whereby to maintain the input member 37 and the gear 102 in mutual alignment.

As thus far described, rotation of the input member 37 by the drive shaft (not shown) operates through the idler gears 42 and 43 to rotate the spur gears 48 and 49. Inasmuch as the spur gears 48 and 49 are respectively keyed to the shafts 50 and 57 to which the gears 65 and 70 are also keyed, the gears 48 and 65 and the gears 49 and 70 rotate in unison.

The bevel gear section 75 of the input member 37 drives the pinion gears 77 and 78 in opposite directions and they in turn drive the multiple gear 102. The multiple gear 102 is also in engagement with the gears 65 and 70. By virtue of the gear ratios in this assembly as more fully described hereinafter the bevel gears 77 and 78 rotate the multiple gear 102 at the same rate as do the spur gears 65 and 70. Accordingly, all of the gears within the housing rotate freely and no torque whatever is coupled from the input member 37 to the output end plate 33 to which the driven shaft is adapted to be keyed.

In order to permit adjustment of the torque transmitted by the unit 12 between the input member 37 and the output end plate 33, there is provided in accordance with the present invention means for exerting an adjustable force on the shafts 80 and 92 in a circumferentially direction relative to the central axis of the shaft 97. Referring to FIG. 6 it may be seen that the housing member 30 is provided with an inwardly extending boss 107 having a tapped hole 108 extending therethrough from the outside wall of the housing member 30 and which is aligned with the center line of the shaft 80. An adjusting member 110 having a screw-driver slot 111 in the outer end thereof is threadedly received in the hole 108 and has an end portion 112 of reduced diameter over which is fitted a washer 113. As best shown in FIG. 7 the rotatable rings 83 and 86 are each provided with slot portions 115 and 116 respectively which together form a flat bottomed cylindrical recess receiving one end of a coil spring 118. The other end of the spring 118 abuts against the washer 113 and is held in position by means of the portion 112 of reduced diameter on the adjusting screw 110. A similar adjusting member 110a is mounted directly opposite to the shaft 92 in a tapped hole 108a in the housing member 30 at a location diametrically opposite to that of the adjusting screw 110. The member 110a thus exerts a force via a coil spring 118a against the rings 83 and 86 at the general location of the stub shaft 92. As viewed in FIG. 6, the springs 118 and 118a produce a couple urging the rings 83 and 86 in a counter-clockwise direction with respect to housing 30. By threading the screws 110 and 110a into their respective holes 108 and 108a the force exerted on the rings 83 and 86 to rotate them in a counter-clockwise direction as viewed in FIG. 6 and a clockwise direction as viewed in FIG. 5 is thus increased.

As may be seen from the drawings, the torque exerted on the bevel gears 77 and 78 by the springs 118 and 118a tends to rotate both of the bevel gears 75 and 105 in the same angular direction (clockwise in FIG. 5) which is, however, prevented by the gear trains including the gears 40, 42, 48, 65 and 104 interconnected between the bevel gears 75 and 105. It follows that the bevel gears 75 and 105 cannot be rotated in opposite directions until the force of the springs 118 and 118a acting to force these gears in the same direction is overcome. Accordingly, when the torque differential between the input gear 37 and the output plate 33 is less than that required to rotate the gears 75 and 105 in opposite directions against the load exerted thereon by the springs 118 and 118a, the entire gear train is locked against rotation and the output plate 33 rotates in unison with the input. When, however, the torque differential exceeds the value necessary to rotate the bevel gears 75 and 105 in opposite directions against the load of the springs 118 and 118a, the gear train rotates within the housing and the output plate 33 remains stationary.

In order to enable simultaneous adjustment of the load on both of the idler bevel gears 77 and 78, such as for a brake, there is provided in accordance with another feature of the present invention the balanced adjusting mechanism shown in FIG. 8. The several gears and the adjusting ring assembly 82 are operatively the same as in the embodiment of the invention shown in FIGS. 4-7. The means for rotating the ring assembly within the housing is, however, different.

Inasmuch as the ring assembly in FIG. 8 is structurally modified it is designated 82a and the individual rings are respectively identified by the reference characters 83a and 86a. The housing is designated 12' and includes a pair of oppositely disposed ears or lugs 120 and 121 which are suitably apertured to rotatably receive a pair of pintels 123 and 124. A cross arm 126 is pivotally secured to the lug 120 by the pintel 123 and is apertured near its ends to receive a pair of pins 128 and 129. Pivotally connected to the pin 128 is a rod 131 which is slidably received in a smooth bore 133 in the housing 12'. The rod 131 has a reduced diameter at 134 to provide an annular shoulder 135. A coil spring 137 is fitted over the end portion 134 of the rod 131 and is partially compressed between the shoulder 135 and the ring assembly 82a. Considered in greater detail, the rings 83a and 86a are grooved to cooperatively provide a cylindrical recess 139 having a bottom wall 141 against which the spring 137 abuts. As shown, the diameter of the bore 139 is substantially larger than the outer diameter of the rod 133 to permit adjustment of the ring assembly 82a between a no load position and a maximum load position.

Diametrically opposite to the bore 133 the housing 12' is provided with a threaded bore 145 receiving a screw 147 having a reduced diameter inner end portion 149 receiving a coil spring 151. The ring assembly 82a is recessed at 153 to receive the spring 151 which is compressed between the bottom wall 154 and an annular shoulder 155 on the screw 147.

A rod 157 extends through a hole 158 in the housing 12' and is pivotally connected to the arm 126 by the pin 129. The rod 157 is connected to the ring assembly 82a by means of a pin 160 and is loosely received in a recess 162 in the ring assembly 82a. A similar rod 164 slidably extends through a hole 166 in the housing 12' and is pivotally connected to an arm 168 by a pin 170. The rod 164 is loosely received in a recess 172 in the ring assembly 82a and is pivotally connected to the ring assembly 82a by a pin 174.

As shown, the arm 168 is pivotally attached to the lug 121 by the pintel 124 and has a hole 176 receiving a portion 178 of the screw 147. The arm 168 abuts a shoulder 180 on the screw 147 and a wheel 182 is keyed to the screw in a suitable manner.

In operation, rotation of the adjusting wheel 182 in a clockwise direction as viewed in FIG. 8 rotates the adjusting ring 82a in a counter-clockwise direction by exerting a torque couple thereon through the springs 137 and 151 and this acts as a brake on the input member 37 while the housing 12' is always held stationary.

While the present invention has been described in connection with certain embodiments thereof many changes and modifications will be readily apparent to those skilled in the art. Therefore, it is intended to cover all such changes and modifications as come within the true spirit and scope of the invention.

I claim:
1. A torque transmission mechanism comprising
   a housing,
   an input member journalled in said housing and including a spur gear section and a bevel gear section,
   a second bevel gear,
   an idler bevel gear intermeshing with said bevel gear section and said second bevel gear,
   a spur gear section fixedly connected to said second bevel gear,
   a pair of spur gears fixedly interconnected and rotatable about the axis of a shaft mounted in said housing parallel to the axis of rotation of said input member,
   one of sid spur gears meshing with one of said spur gear sections,
   an idler gear meshing with the other of said spur gears and the other of said spur gear sections, and
   means for adjustably loading said idler bevel gear to prevent rotation thereof when the torque differential between said input member and said housing is less than a preselected value.

2. A torque transmission according to claim 1 wherein said means comprises
   adjustable force applying means for urging said idler bevel gear in a direction tangential to the axis of rotation of said bevel gear section.

3. A torque transmission according to claim 2 wherein said force applying means includes
   a shaft on which said idler bevel gear is free rotatable and
   an adjusting member threadedly received in said housing and axially adjustable in said housing to exert a force on said shaft in said tangential direction.

4. A power transmission mechanism comprising
   a housing member,
   an input member journalled in said housing,
   a first gear connected to said input member,
   an idler gear connected to said first gear,
   a second gear connected to said idler gear to be driven thereby,
   a shaft mounting said second gear,
   a third gear mounted on said shaft for rotation in unison with said second gear,
   means mounting said shaft at a fixed position in said housing,
   a first bevel gear connected to said input member,
   a second bevel gear aligned with said first bevel gear,
   an idler bevel gear interconnecting said first and second bevel gears,
   a fourth gear meshing with said third gear and being directly connected to said second bevel gear to be rotated in unison therewith,
   means for adjusting the tooth load between said idler bevel gear and said first and second bevel gears, and
   means for connecting said housing to a load to be driven by a driving mechanism connected to said input member.

5. A transmission comprising
   a frame,
   an input member journalled in said frame,
   an output member fixedly connected to said frame,
   first and second gear trains connected between said input member and said frame, said gear trains being adapted to rotate freely within said frame when the torque differential between said input member and said output member exceeds a predetermined value, and means for adjusting the load on one of said gear trains thereby to adjust the said predetermined value of torque differential.

6. A transmission according to claim 5 wherein said means for adjusting comprises means for adjusting the gear tooth load in said one of said gear trains.

7. A shock-absorbing torque transmission mechanism comprising a frame, an input member journalled in said frame and including first and second gear sections, a third gear, a fourth gear interconnecting said second and third gears, a fifth gear fixedly connected to said third gear, a pair of sixth and seventh gears fixedly interconnected and rotatable about the axis of a shaft mounted in said frame parallel to the axis of rotation of said input member, one of said sixth and seventh gears meshing with one of said first gear and said fifth gear, an eighth idler gear meshing with the other of said sixth and seventh gears and the other of said first and fifth gears, and means for adjustably loading said third gear to prevent rotation thereof when the torque differential between said input member and said frame is less than a preselected value.

8. A torque transmission mechanism comprising an input member adapted to be rotatably driven by a driving member, an output member, gear train means including a plurality of mating gears connecting said input member to said output member for permitting independent relative rotation of said input and output members only when said gear train is free to rotate and for locking said input and output members together when said gear train is not free to rotate, and means for exerting an adjustable preset load on said gear train to prevent rotation of said gears therein only when the torque differential between said input and output members is less than a predetermined value.

References Cited by the Examiner

UNITED STATES PATENTS

| | | | |
|---|---|---|---|
| 2,209,367 | 7/1940 | Watson | 74—751 |
| 2,668,459 | 2/1954 | Berklege | 74—751 |
| 3,015,967 | 1/1962 | Bancroft | 74—751 X |
| 3,203,524 | 8/1965 | Orwin | 192—56 |

DAVID J. WILLIAMOWSKY, *Primary Examiner.*

L. H. GERIN, *Assistant Examiner.*